United States Patent [19]

Okano et al.

[11] Patent Number: 4,758,477

[45] Date of Patent: Jul. 19, 1988

[54] LAMINATE AND PROCESS FOR ITS PRODUCTION

[75] Inventors: Shigeaki Okano, Atsugi; Katsuhiko Hayashi, Machida; Hidehito Kato, Yokohama, all of Japan

[73] Assignee: Mitsubishi Chemical Industries Ltd., Tokyo, Japan

[21] Appl. No.: 833,027

[22] Filed: Feb. 26, 1986

[51] Int. Cl.[4] .................... B32B 27/08; B32B 27/28; B32B 27/32; B32B 27/34
[52] U.S. Cl. .................... 428/475.2; 156/244.11; 428/476.1; 428/476.9; 428/483; 428/518; 428/520
[58] Field of Search ............ 156/244.11; 428/475.2, 428/476.1, 476.9, 483, 518, 520

[56] References Cited

U.S. PATENT DOCUMENTS 4,058,647  11/1977  Inoue et al. .................... 428/480

FOREIGN PATENT DOCUMENTS

| 98784 | 8/1976 | Japan . |
| 43055 | 11/1976 | Japan . |
| 8035 | 1/1977 | Japan . |
| 25845 | 2/1977 | Japan . |
| 11032 | 4/1978 | Japan . |
| 82 | 1/1979 | Japan . |

Primary Examiner—James C. Cannon
Attorney, Agent, or Firm—Oblon, Fisher, Spivak, McClelland & Maier

[57] ABSTRACT

A process for producing a laminate which comprises laminating a composition comprising from 70 to 98% by weight of a crystalline ethylene-vinyl acetate copolymer having a vinyl acetate content of from 5 to 15% by weight, and from 2 to 30% by weight of a modified ethylene copolymer obtained by graft-polymerizing at least 0.03 and less than 1% by weight of maleic anhydride to a copolymer of ethylene with an α-olefin of at least 3 carbon atoms having a crystallinity of less than 30%, on a polyamide resin, a polyester resin or a saponified ethylene-vinyl acetate copolymer, in a molten state.

13 Claims, 1 Drawing Sheet

LAMINATE AND PROCESS FOR ITS PRODUCTION

BACKGROUND OF THE INVENTION

1. Field of the Invention

The present invention relates to a resin laminate, and a process for its preparation. More particularly, it relates to a resin laminate of a polyolefin composition and a polyamide resin, a polyester resin or a saponified ethylene-vinyl acetate copolymer, having improved adhesion strength and a process for its production.

2. Description of the Prior Art

Conventional polyamide resins, polyester resins and saponified ethylene-vinyl acetate copolymers have excellent gas barrier properties, oil resistance, mechanical strength, etc. However, they have drawbacks that they are expensive and they have high water-permeability. These resins are not economically competitive with vinyl chloride resins which are inexpensive, although their gas barrier properties and oil resistance are superior to the vinyl chloride resins. As such they have been rarely used as packaging materials for food products. In recent years, a vinyl chloride monomer remaining in a vinyl chloride resin has been made an issue, and as a substitute for the vinyl chloride resin as a packaging material for food products, an attention has been drawn to a laminate of a polyolefin resin and a polyamide resin, a polyester resin or a saponified product of ethylene-vinyl acetate copolymer. This laminate has gas barrier properties, oil resistance and water-impermeability at the same time, and, as such, is useful for e.g. a container for food products such as mayonnaise or sauce, whereby it is possible to store such food products for a long period of time. On the other hand, for a use other than the use as a packaging material for food products, the polyolefin resin was not suitable for use as a container for gasoline because of the poor oil resistance. However, by making it into such a laminate, the oil resistance has been improved and it has been made possible to use it as a container for gasoline.

As described in the foregoing, the area of applications of the laminate of the polyolefin resin and a polyamide resin, a polyester resin or a saponified ethylene-vinyl acetate copolymer has been expanded. However, the polyolefin resin and the three types of other resins have poor affinity to each other, which brings about a drawback that the melt bonding can not readily be made. Various methods have been proposed to impart adhesive force.

As one of such methods, there has been a method in which a polyolefin resin is graft-modified with an unsaturated carboxylic acid or its anhydride, and the polyolefin resin and a polyamide resin are co-extruded to obtain a laminated sheet having excellent adhesion strength (Japanese Examined Patent Publication No. 43055/1976). In this case, a solution method or a slurry method may be employed as a method for the graft-modification of the polyolefin resin. However, a melt mixing method is preferred from an economical point of view.

However, when the polyolfin resin is graft-modified with an unsaturated carboxylic acid or its anhydride by means of a melt mixing method, gelation, fish eyes, color development, etc. which are fatal to films or sheets, are likely to occur. On the other hand, if the graft rate of the unsaturated carboxylic acid is maintained at a low level in order to avoid such problems, the adhesion strength of the resulting modified polyolefin will be inadequate. Under the circumstances, there have been some attempts for improvement of the adhesion by blending certain additives to the modified polyolefins. For instance, there may be mentioned a method of blending a rubber substance having a Mooney viscosity of from 40 to 150 to a modified polyolefin (Japanese Unexamined Patent Publication No. 98784/1976), a method of blending a low density polyethylene to a modified high density polyethylene (Japanese Unexamined Patent Publication No. 25845/1977) or a method of modifying a blend of a polyolefin and a rubber compound with an unsaturated carboxylic acid (Japanese Unexamined Patent Publication No. 8035/1977). These methods are effective for an improvement of the adhesion to some extent, but the effectiveness is not yet adequate. Besides, the blending with the rubber substance involves cumbersome mixing operation, which adds to the cost of the modified polyolefin.

Further, it has been proposed to use a composition obtained by incorporating a graft-copolymer of a polyolefin with an unsaturated carboxylic acid into an ethylene-vinyl acetate copolymer, for the preparation of a laminate with a polyamide layer (Japanese Examined Patent Publication No. 11032/1978). However, in this method, the polyolefin to be grafted is a conventional polyethylene or polypropylene having a high crystallinity, and therefore the adhesion with the polyamide layer is not necessarily adequate.

The present applicants have proposed in Japanese Unexamined Patent Publication No. 82/1979 to use a polyolefin composition comprising a crystalline polyolefin resin and an ethylene-α-olefin copolymer graft-modified with maleic anhydride, for the melt lamination of a polyolefin resin having a high crystallinity and a polyamide resin, a polyester resin or a saponified ethylene-vinyl acetate copolymer.

The present invention is an improvement over the earlier proposal.

In the melt lamination of an olefin resin and a polyamide resin, a polyester resin or a saponified ethylene-vinyl acetate copolymer, the olefin resin is required to have high interlayer adhesion strength and good transparency and not to lead to gelation, formation of fish eyes or undesirable color development, and it is further required to have good heat sealing properties when used in a laminated film and to be flexible when used at a low temperature.

SUMMARY OF THE INVENTION

The present inventors have conducted extensive researches taking these points into consideration, and have found that by using a composition obtained by blending a crystalline ethylene-vinyl acetate copolymer (hereinafter referred to simply as "EVA") having a certain specific vinyl acetate content and an ethylene copolymer having no crystallinity or a crystallinity lower than EVA, graft-modified with maleic anhydride, it is possible to obtain a laminate having extremely high interlayer adhesion strength, good transparency and heat sealing properties and flexibility without leading to gelation, formation of fish eyes or undesirable color development. The present invention has been accomplished on the basis of this discovery.

Namely, the present invention provides a process for producing a laminate which comprises laminating a composition comprising from 70 to 98% by weight of EVA (a crystalline ethylene-vinyl acetate copolymer) having a vinyl acetate content of from 5 to 15% by weight, and from 2 to 30% by weight of a modified ethylene copolymer obtained by graft-polymerizing at least 0.03 and less than 1% by weight of maleic anhydride to a copolymer of ethylene with an α-olefin of at least 3 carbon atoms having a crystallinity of less than 30%, on a polyamide resin, a polyester resin or a saponified ethylene-vinyl acetate copolymer, in a molten state.

The present invention also provides a laminate comprising a layer of the above-mentioned composition and a layer of a polyamide resin, a polyester resin or a saponified ethylene-vinyl acetate copolymer.

BRIEF DESCRIPTION OF THE DRAWING

In the accompanying drawing.

DETAILED DESCRIPTION OF THE PREFERRED EMBODIMENTS

Figure 1:
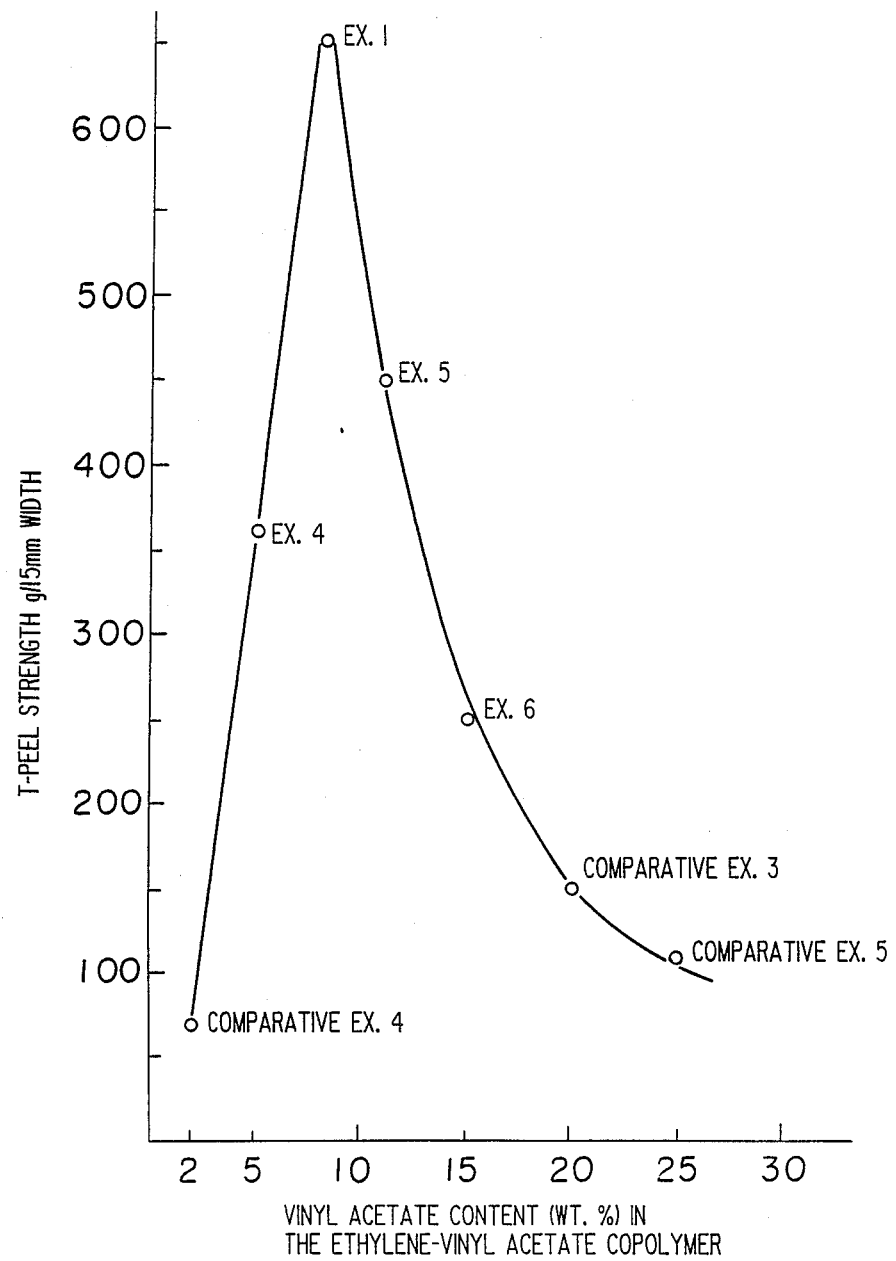
FIG. 1 is a graph illustrating the relation between the vinyl acetate content in the ethylene-vinyl acetate copolymer and the T-peel strength obtained from Examples 1 and 3–6 and Comparative Examples 3–5 given hereinafter.

EVA used in the present invention is a crystalline resin, i.e. a resin having a crystallinity of at least 30% at a temperature of 20° C. (as measured by the X-ray method disclosed in J. Poly. Sci., XVIII, 17–26 (1955)) and the vinyl acetate content is from 5 to 15% by weight. EVA may be a blend of EVA with an ethylene homopolymer such as a high-pressure low-density polyethylene, a high-density polyethylene or a linear low-density polyethylene or a copolymer of ethylene with an α-olefin. In this case, the vinyl acetate content in the blend composition is from 5 to 15% by weight.

The modified ethylene copolymer obtained by graft-polymerizing at least 0.03 and less than 1% by weight of maleic anhydride to a copolymer of ethylene with an α-olefin of at least 3 carbon atoms having a crystallinity of less than 30% (hereinafter referred to simply as a "modified ethylene copolymer") is a copolymer of ethylene with an α-olefin of at least 3 carbon atoms having a crystallinity of less than 30% (hereinafter referred to simply as an "ethylene copolymer") to which or to a part of which a monomer or polymer of maleic anhydride is chemically bonded, wherein the bonded amount is at least 0.03 and less than 1% by weight as calculated as a maleic anhydride monomer relative to the ethylene copolymer. If the bonded amount is less than 0.03% by weight, the resin laminate obtained by the process of the present invention (hereinafter referred to simply as a "laminate") will have poor interlayer adhesion strength, and if the bonded amount exceeds 1% by weight, the gelation, color development, etc. of the laminate tend to increase, such being undesirable. Within this range, preferred is from 0.05 to 0.8% by weight.

As the copolymer of ethylene with an α-olefin of at least 3 carbon atoms as the base material, there may be employed such a copolymer having a crystallinity of less than 30% at a temperature of 20° C. (as measured by the above-mentioned measuring method). If the crystallinity of the ethylene copolymer is 30% or higher, no adequate improvement in the interlayer adhesion strength of the laminate is obtainable. Among these copolymers, copolymers having a crystallinity of at least 2% and less than 30% are preferred, and particularly preferred are copolymers having a crystallinity of from 15 to 25%. Further, an ethylene copolymer having a crystallinity lower by at least 10% than the crystallinity of the above-mentioned EVA is preferred. If the difference in the crystallinity between the two is less than 10%, no adequate improvement in the adhesion strength of the laminate is obtainable. The ethylene content in the ethylene copolymer is preferably at least 50 mol % and not more than 90 mol %. As the α-olefin of at least 3 carbon atoms as a copolymer component, propylene, butene-1, pentene-1, hexene-1 or 4-methylpentene-1 may be mentioned. Among them, an α-olefin having from 3 to 8 carbon atoms, particularly propylene or butene-1, is preferred. In the present invention, the ethylene copolymer further includes a three component copolymer obtained by the copolymerization of ethylene with an α-olefin of at least 3 carbon atoms and with a non-conjugated diene. As such a non-conjugated diene, 1,4-hexadiene, dicyclopentadiene or ethylidene norbornene may be mentioned. Such an ethylene copolymer may be prepared by copolymerizing ethylene with an α-olefin and, if necessary, a non-conjugated diene, by using a Ziegler-Natta catalyst.

Thus, the modified ethylene copolymer of the present invention may be prepared by adding maleic anhydride to the above-mentioned ethylene copolymer, followed by a graft reaction in accordance with a conventional method. The graft reaction may be conducted by a solution method or a slurry method. However, from an economical point of view, it is preferred to employ a melt mixing method. In the case of the melt mixing method, it is advantageous to incorporate at least 0.03 and less than 1% by weight of maleic anhydride and not more than 0.1% by weight, preferably from 0.001 to 0.05% by weight of an organic peroxide to the ethylene copolymer, followed by melt mixing at a temperature of from 120° to 300° C., whereby a modified ethylene copolymer having high graft efficiency, no gelation, good hue and no odor, is obtainable. Further, as will be described hereinafter, it is preferred to employ a modified ethylene copolymer having a Mooney viscosity of not higher than 100 (as measured by ASTM D-15, $ML_{I+4}$ 100° C.). Therefore, as the base material ethylene copolymer, it is preferred to employ the one having a Mooney viscosity of from 5 to 60. The blending of the modified ethylene copolymer and EVA may be conducted by introducing the two materials into a mixer such as a V-blender, a tumbler or a Henschel mixer and subjecting them to so-called dry blending to obtain a blend, and the blend is kneaded in an extruder at a temperature of from 120° to 250° C. The blending can be conducted also by a Bumbury's mixer. However, since the kneading time, the kneading temperature, etc. will have to be changed every time when the grade of EVA is changed, and the modified ethylene copolymer has high adhesive properties, it is important to properly select the conditions for the discharge from the Bumbury's mixer. For these reasons, it is simpler and preferred to conduct the blending by means of an extruder.

In the blend of the modified ethylene copolymer and EVA, if the amount of the modified ethylene copolymer is less than 2% by weight, no adequate improvement in the interlayer adhesion strength of the laminate will be obtained. On the other hand, if the modified ethylene copolymer exceeds 30% by weight, no further improvement of the apparent interlayer adhesion strength is obtainable. The preferred amount of the modified ethylene copolymer is from 5 to 20% by weight. Further, the interlayer adhesion strength of the laminate varies substantially depending upon the vinyl acetate content in EVA, and as shown in the Examples given hereinafter and FIG. 1, the maximum interlayer adhesion strength is obtained when the vinyl acetate content is about 8% by weight. Thus, the vinyl acetate content is from 5 to 15% by weight. If the amount is less than 5% by weight, the interlayer adhesion tends to be poor, and if the amount exceeds 15% by weight, the interlayer adhesion strength tends to deteriorate, and when made into a film, fish eyes are likely to form, and when it is used as the inner most layer, blocking is likely to increase.

Further, if the Mooney viscosity of the modified ethylene copolymer exceeds 100 (as measured by ASTM D-15, $ML_{I+4}$ 100° C.), it is difficult to conduct uniform blending of the modified ethylene copolymer and EVA simply by blending and extruding the pellets through the extruder. Therefore, the Mooney viscosity of the modified ethylene copolymer is preferably not higher than 100.

The polyamide resin to be used in the present invention may be a linear polymer having an acid amide bond obtained by ring-opening polymerization of lactam or polycondensation of a diamine and dicarboxylic acid. For instance, it has an average molecular weight of from 15,000 to 60,000 and $[\eta]=1.0-6.0$. More specifically, there may be employed Nylon 6, Nylon 6,6, Nylon 6,10, Nylon 11, Nylon 6,11 or Nylon 6T.

The polyester resin is the one obtained by polycondensation of a saturated dibasic acid and a glycol. For instance, it has an average molecular weight of 15,000 to 45,000 and $[\eta]=1.0-6.0$. Specifically, there may be employed a polyethylene terephthalate obtained from ethylene glycol and terephthalic acid, or a polyethylene terephthalate copolymer containing as a copolymer component a saturated dibasic acid such as adipic acid, azelaic acid, succinic acid, oxalic acid, phthalic acid or isophthalic acid.

The saponified ethylene-vinyl acetate copolymer is an ethylene-vinyl acetate copolymer with its acetic acid groups partially or almost wholly saponified to introduce OH groups. There is no particular restriction as to the chemical composition. For instance, it has an average molecular weight of 10,000 to 100,000 and an ethylene content of from 10 to 70 mol %. In view of the gas barrier properties, the film-forming properties, etc., it is preferred to employ a product obtained by saponifying an ethylene-vinyl acetate copolymer having an ethylene content of from 30 to 50 mol % so that the saponification degree is at least 90%.

According to the present invention, the composition comprising the modified ethylene copolymer thus obtained and EVA, is laminated on the above-mentioned polyamide resin, polyester resin or saponified ethylene-vinyl acetate copolymer, in a molten state to form a laminate such as a composite film or a composite sheet. If the polyolefin composition is not in a molten state, no adequate improvement of the interlayer adhesion strength of the laminate is obtainable. There is no particular restriction as to the manner for lamination. The composition of the modified ethylene copolymer and EVA is laminated in a molten state to the polyamide resin, polyester resin or saponified ethylene-vinyl acetate copolymer to bring the two materials in intimate contact with each other. For instance, there may be employed a conventional method such as heat pressing by means of a press, inflation co-extrusion, co-extrusion double layer blow molding or co-extrusion lamination. The thickness of the laminate may vary depending upon the particular purpose, and there is no particular restriction as to the thickness. However, it is usual that the layer of the composition comprising the modified ethylene copolymer and EVA is from 5 μm to 5 mm, and the thickness of the layer of the polyamide resin, polyester resin or saponified ethylene-vinyl acetate copolymer is from 5 μm to 5 mm. The resin laminate obtained by the process of the present invention is useful for films and bottles for packaging food products, films and bottles for packaging drugs, bottles for agricultural chemicals or containers for gasoline, by virtue of the excellent gas impermeability and solvent resistance.

Now, the present invention will be described with reference to Examples and Comparative Examples. However, it should be understood that the present invention is by no means restricted by these specific Examples.

In the Examples, "MI" means a melt index in accordance with ASTM D-1238-57T.

EXAMPLES 1 to 3 and COMPARATIVE EXAMPLES 1 and 2

100 parts by weight of an ethylene-propylene copolymer having an ethylene content of 83 mol %, a crystallinity of 5% (as measured at 20° C. in accordance with J. Poly. Sci., XVIII 17–26 (1955), the same applies hereinafter), a MI of 1.0 g/10 min and a Mooney viscosity of 20 (as measured by ASTM D-15, $ML_{I+4}$ 100° C., the same applies hereinafter), 0.025 part by weight of $\alpha,\alpha'$-bis-t-butylperoxy-p-diisopropylbenzene dissolved in a small amount of acetone and 0.8 part by weight of maleic anhydride were blended in a Henschel mixer. The granular mixture was extruded at 230° C. by means of an extruder having an internal diameter of 40 mmφ and L/D=28 and pelletized. A part of pellets thereby obtained was pulverized, and then unreacted maleic anhydride was extracted with acetone for 12 hours by means of a Soxhlet extractor. The amount of maleic anhydride in the product was quantitatively analyzed by infrared spectrum analysis, whereby 0.7% by weight of maleic anhydride was found to be graft-polymerized. The modified ethylene copolymer pellets thus obtained (MI=0.9 g/10 min) and pellets of EVA [YUKALON-EVA (trademark of Mitsubishi Petrochemical Co.) V-203F, density: 0.93 g/cm³, vinyl acetate content: 8% by weight, crystallinity: 58%, MI=1.5 g/10 min] were dry-blended in a V-blender in the proportions as identified in Table 1, and then extruded at 200° C. by means of an extruder having an internal diameter of 40 mmφ and L/D=28 and pelletized to obtain pellets of a mixture composition of the modified ethylene copolymer and EVA.

The mixture composition of the modified ethylene copolymer and EVA, and the saponified ethylene-vinyl acetate copolymer resin [Soanol (trademark of Nippon Synthetic Chemical Ind.) E] were co-extruded within a die to obtain a composite inflation film with an inner layer of the mixture composition of the modified copolymer and EVA and an outer layer of the saponified ethylene-vinyl acetate copolymer resin.

The co-extrusion was conducted under the following conditions:

Inner diameter of the die: 80 mmφ, die temperature: 210° C., extruder for the mixture composition of the modified ethylene copolymer and EVA: 40 mmφ, L/D=24 and temperature of 210° C., and extruder for the saponified ethylene-vinyl acetate copolymer resin: 30 mmφ, L/D=20 and temperature of 210° C. Winding-up rate: 6.5 m/min, blow-up ratio: 1.2, thickness of the saponified ethylene-vinyl acetate copolymer resin film: 50 μm, and the thickness of the mixture composition of the modified ethylene copolymer and EVA: 50 μm. The T-peel strength of this composite film was measured in accordance with JIS K-6854. The results are shown in Table 1. With respect to Example 1, the results are also shown in FIG. 1.

EXAMPLE 4

A mixture composition comprising 15% by weight of the modified ethylene copolymer as prepared in Example 1 and 85% by weight of EVA [YUKALON-EVA (trademark of Mitsubishi Chemical Co.) V-213K, density: 0.92 g/cm$^3$, vinyl acetate content: 5% by weight, crystallinity: 62%, MI=3.0 g/10 min)] was co-extruded with an ethylene-vinyl acetate copolymer to obtain a composite film in the same manner as in Example 1. The results of the T-peel strength test are shown in Table 1 and FIG. 1.

EXAMPLE 5

A composite film was obtained in the same manner as in Example 4 except that EVA in Example 4 was substituted by YUKALON-EVA (trademark of Mitsubishi Petrochemical Co.) V-303K (density: 0.93 g/cm$^3$, vinyl acetate content: 11% by weight, crystallinity: 53%, MI=3.5 g/10 min). The results of the T-peel strength test are shown in Table 1 and FIG. 1.

EXAMPLE 6

A composite film was obtained in the same manner as in Example 4 except that EVA in Example 4 was substituted by YUKALON-EVA (trademark of Mitsubishi Petrochemical Co.) V-403H (density: 0.94 g/cm$^3$, vinyl acetate content: 15% by weight, crystallinity: 47%, MI=2.0 g/10 min). The results of the T-peel strength test are shown in Table 1 and FIG. 1.

COMPARATIVE EXAMPLE 3

A composite film was obtained in the same manner as in Example 4 except that EVA in Example 4 was substituted by YUKALON-EVA (trademark of Mitsubishi Petrochemical Co.) V-501H (density: 0.94 g/cm$^3$, vinyl acetate content: 20% by weight, crystallinity: 40%, MI=2.5 g/10 min). The results of the T-peel strength test are shown in Table 1 and FIG. 1.

COMPARATIVE EXAMPLE 4

A composite film was obtained in the same manner as in Example 4 except that EVA in Example 4 was substituted by a blend (vinyl acetate content: 2% by weight) comprising 40% by weight of YUKALON-EVA (trademark of Mitsubishi Petrochemical Co.) V-213K (density: 0.92 g/cm$^3$, vinyl acetate content: 5% by weight, crystallinity: 62%, MI=3.0 g/10 min) and 60% weight of a low density polyethylene [NOVATEC-L (trademark of Mitsubishi Chemical Industries, Ltd.) F-155, density: 0.927 g/cm$^3$, crystallinity: 48%, MI=2.0 g/10 min]. The results of the T-peel strength test are shown in Table 1 and FIG. 1.

COMPARATIVE EXAMPLE 5

A composite film was obtained in the same manner as in Example 4 except that EVA in Example 4 was substituted by YUKALON-EVA (trademark of Mitsubishi Petrochemical Co.) V-505 (density: 0.95 g/cm$^3$, vinyl acetate content: 25% by weight, crystallinity: 33%, MI=2.0 g/10 min). The results of the T-peel strength test are shown in Table 1 and FIG. 1. This composite film had substantial blocking at the inner surface.

FIG. 1 illustrates the relation between the vinyl acetate content in the ethylene-vinyl acetate copolymer and the T-peel strength in Examples 1 and 3–6 and Comparative Examples 3–5. As is evident from FIG. 1, the interlayer adhesion strength becomes maximum when the vinyl acetate content is about 8% by weight.

EXAMPLE 7

A mixture composition comprising the modified ethylene copolymer and EVA as obtained in Example 1 and a polyester resin [NOVAPET (trademark of Mitsubishi Chemical Industries, Ltd.) $[\eta]=0.7$] were co-extruded within a die to obtain a composite inflation film with an inner layer of the mixture composition comprising the modified ethylene copolymer and EVA and an outer layer of the polyester resin. The co-extrusion was conducted at a die temperature of 270° C. with an inner diameter of the die being 80 mmφ. Winding-up rate: 6.5 m/min, blow-up ratio: 1.2, thickness of the polyester layer: 50 μm, thickness of the layer of the mixture composition comprising the modified ethylene copolymer and EVA: 50 μm. The T-peel strength of this composite film was 410 g/15 mm width.

EXAMPLE 8

The mixture composition comprising the modified ethylene copolymer and EVA as obtained in Example 1 and a polyamide resin [NOVAMID (trademark of Mitsuibishi Chemical Industries, Ltd.) 2030A] were co-extruded within a die to obtain a composite inflation film with an inner layer of the mixture composition comprising the modified ethylene copolymer and EVA and an outer layer of the polyamide resin. The co-extrusion was conducted at a die temperature of 230° C. with an inner diameter of the die of 80 mmφ. Winding-up rate: 6.5 m/min, blow-up ratio: 1.2, thickness of the polyamide resin layer: 50 μm, thickness of the layer of the mixture composition comprising the modified ethylene copolymer and EVA: 50 μm. The T-peel strength of this composite film was so strong that no peeling was possible.

TABLE 1

|  | Modified ethylene copolymer content (wt. %) | Ethylene-vinyl acetate copolymer content (wt. %) | Vinyl acetate content in the ethylene-vinyl acetate copolymer (wt. %) | EVA/LDPE | T-peel strength (g/15 mm width) |
| --- | --- | --- | --- | --- | --- |
| Example 1 | 15 | 85 | 8 | — | 650 |
| Example 2 | 5 | 95 | 8 | — | 300 |
| Example 3 | 30 | 70 | 8 | — | 460 |
| Comparative Example 1 | 40 | 60 | 8 | — | 230 |
| Comparative Example 2 | 1 | 99 | 8 | — | 10 |

TABLE 1-continued

| | Modified ethylene copolymer content (wt. %) | Ethylene-vinyl acetate copolymer content (wt. %) | Vinyl acetate content in the ethylene-vinyl acetate copolymer (wt. %) | EVA/LDPE | T-peel strength (g/15 mm width) |
| --- | --- | --- | --- | --- | --- |
| Example 4 | 15 | 85 | 5 | — | 360 |
| Example 5 | 15 | 85 | 11 | — | 450 |
| Example 6 | 15 | 85 | 15 | — | 250 |
| Comparative Example 3 | 15 | 85 | 20 | — | 150 |
| Comparative Example 4 | 15 | — | (2) | 85 { 40(VA = 5 wt. %) 60(LDPE) } | 70 |
| Comparative Example 5 | 15 | 85 | 25 | — | 110 |

EXAMPLES 9 and 10

0.5 part by weight of maleic anhydride and 0.025 part by weight of α,α'-bis-t-butylperoxy-p-diisopropylbenzene were added to 100 parts by weight of an ethylene-butene-1 copolymer (butene content: 13 mol %, density: 0.89 g/cm$^3$, crystallinity by X-ray: 20%), and the mixture was melt-mixed in the same manner as in Example 1 to obtain a modified ethylene copolymer with 0.45 part by weight of maleic anhydride grafted. This modified ethylene copolymer and EVA [YUKALON-EVA (trademark of Mitsubishi Petrochemical Co.) V-203F, density: 0.93 g/cm$^3$, vinyl acetate content: 8% by weight, crystallinity: 58%, MI=1.5 g/10 min] were mixed in the proportions as identified in Table 2 and pelletized. The pelletized composition and the saponified ethylene-vinyl acetate copolymer [Soanol (trademark of Nippon Synthetic Chemical Industry) E] were laminated in the same manner as in Example 1. The adhesive strength was measured in the same manner as in Example 1. The results are shown in Table 2.

TABLE 2

| | Modified ethylene copolymer content (wt. %) | Ethylene-vinyl acetate copolymer content (wt. %) | Vinyl-acetate content in EVA (wt. %) | T-peel strength (g/15 mm width) |
| --- | --- | --- | --- | --- |
| Example 9 | 15 | 85 | 8 | 700 |
| Example 10 | 30 | 70 | 8 | 730 |

COMPARATIVE EXAMPLE 6

A composite film was obtained in the same manner as in Example 9 except that the ethylene-butene-1 copolymer in Example 9 was substituted by a high-pressure low-density polyethylene [NOVATEC (trademark of Mitsubishi Chemical Industries, Ltd.) F-150, density: 0.923 g/cm$^3$, crystallinity: 54%, MI=2.0 g/10 min]. The adhesion strength to the saponified ethylene-vinyl acetate copolymer (T-peel strength) was 100 g/15 mm width.

EXAMPLE 11

A composite film with a polyamide resin was obtained in the same manner as in Example 8 except that the mixture composition comprising the modified ethylene copolymer and EVA as obtained in Example 10 was employed. The peel strength of this composite film was so strong that no peeling was possible.

COMPARATIVE EXAMPLE 7

0.7 part by weight of maleic anhydride and 0.04 part by weight of α,α'-bis-t-butylperoxy-p-diisopropylbenzene were added to 100 parts by weight of a high-pressure low density polyethylene [NOVATEC (tradename of Mitsubishi Chemical Industries, Ltd.) L-M420, density: 0.918 g/cm$^3$, crystallinity: 48%, MI=22 g/10 min], and the mixture was subjected to the graft-polymerization under the same condition as in Example 1 to obtain a modified low-density polyethylene with 0.4 part by weight of maleic anhydride grafted. This modified low-density polyethylene and EVA [YUKALON-EVA (tradename of Mitsubishi Petrochemical Co.) V-403H, density: 0.94 g/cm$^3$, vinyl acetate content: 15% by weight, crystallinity: 47%, MI=2.0 g/10 min] were blended at a ratio of 30/70. By using this blend composition, co-extrusion with a polyamide resin was conducted in the same manner as in Example 8 to obtain a composite film. The T-peel strength of this composite film was 280 g/15 mm width.

What is claimed is:

1. A process for producing a laminate which comprises laminating (A) a composition comprising (i) from 70 to 98% by weight of a crystalline ethylene-vinyl acetate copolymer having a vinyl acetate content of from 5 to 15% by weight, and (ii) from 2 to 30% by weight of a modified ethylene copolymer obtained by graft-polymerizing at least 0.03 and less than 1% by weight of maleic anhydride to a copolymer of ethylene with an α-olefin of at least 3 carbon atoms having a crystallinity of less than 30% onto (B) a polyamide resin, a polyester resin or a saponified ethylene-vinyl acetate copolymer, in a molten state.

2. The process according to claim 1, wherein the crystalline ethylene-vinyl acetate copolymer contains a high-pressure low-density polyethylene, a high-density polyethylene or a linear low-density polyethylene, and said composition has a vinyl acetate content of from 5 to 15% by weight.

3. The process according to claim 1, wherein the modified ethylene copolymer is obtained by graft-polymerizing at least 0.03 and less than 1% by weight of maleic anhydride to an ethylene-butene-1 or ethylene-propylene copolymer having a crystallinity of at least 2% and less than 30%, which is lower by at least 10% than the crystallinity of the crystalline ethylenevinyl acetate copolymer.

4. The process according to claim 1, wherein the modified ethylene copolymer is obtained by incorporating at least 0.03 and less than 1% by weight of maleic anhydride and from 0.01 to 0.05% by weight of an organic peroxide to an ethylene-butene-1 or ethylene-propylene copolymer having a crystallinity of at least 2% and less than 30%, and melt-mixing the mixture at a temperature of from 120° to 300° C. for graft-polymerization.

5. The process according to claim 1, wherein the composition comprises from 80 to 95% by weight of the crystalline ethylene-vinyl acetate copolymer and from 5 to 20% by weight of the modified ethylene copolymer.

6. The process according to claim 1, wherein the composition is laminated on a polyamide resin in a molten state.

7. The process according to claim 1, wherein the composition is laminated on a polyester resin in a molten state.

8. The process according to claim 1, wherein the composition is laminated on a saponified ethylene-vinyl acetate copolymer in a molten state.

9. A laminate comprising a layer of a composition comprising from 70 to 98% by weight of a crystalline ethylene-vinyl acetate copolymer having a vinyl acetate content of from 5 to 15% by weight, and from 2 to 30% by weight of a modified ethylene copolymer obtained by graft-polymerizing at least 0.03 and less than 1% by weight of maleic anhydride to a copolymer of ethylene with an α-olefin of at least 3 carbon atoms having a crystallinity of less than 30%, and a layer of a polyamide resin, a polyester resin or a saponified ethylene-vinyl acetate copolymer.

10. The laminate according to claim 9, wherein the crystalline ethylene-vinyl acetate copolymer contains a high-pressure low-density polyethylene, a high-density polyethylene or a linear low-density polyethylene, and said composition has a vinyl acetate content of from 5 to 15% by weight.

11. The laminate according to claim 9, wherein the modified ethylene copolymer is obtained by graft-polymerizing at least 0.03 and less than 1% by weight of maleic anhydride to an ethylene-butene-1 or ethylene-propylene copolymer having a crystallinity of at least 2% and less than 30%, which is lower by at least 10% than the crystallinity of the crystalline ethylenevinyl acetate copolymer.

12. The laminate according to claim 9, wherein the modified ethylene copolymer is obtained by incorporating at least 0.03 and less than 1% by weight of maleic anhydride and from 0.01 to 0.05% by weight of an organic peroxide to an ethylene-butene-1 or ethylene-propylene copolymer having a crystallinity of at least 2% and less than 30%, and melt-mixing the mixture at a temperature of from 120° to 300° C. for graft-polymerization.

13. The laminate according to claim 9, wherein the composition comprises from 80 to 95% by weight of the crystalline ethylene-vinyl acetate copolymer and from 5 to 20% by weight of the modified ethylene copolymer.

* * * * *